United States Patent
Kang

(10) Patent No.: US 10,067,903 B2
(45) Date of Patent: Sep. 4, 2018

(54) SEMICONDUCTOR DEVICE

(71) Applicant: SK hynix Inc., Icheon-si, Gyeonggi-do (KR)

(72) Inventor: Hyuk Choong Kang, Seongnam-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 0 days.

(21) Appl. No.: 15/816,424

(22) Filed: Nov. 17, 2017

(65) Prior Publication Data
US 2018/0074989 A1 Mar. 15, 2018

Related U.S. Application Data

(63) Continuation-in-part of application No. 14/977,813, filed on Dec. 22, 2015, now Pat. No. 9,852,089.

(30) Foreign Application Priority Data

Jul. 30, 2015 (KR) .................. 10-2015-0108192

(51) Int. Cl.
*G06F 13/40* (2006.01)
*G06F 13/16* (2006.01)

(52) U.S. Cl.
CPC ...... *G06F 13/4068* (2013.01); *G06F 13/1694* (2013.01)

(58) Field of Classification Search
CPC .................................................. G06F 13/1694
See application file for complete search history.

(56) References Cited

U.S. PATENT DOCUMENTS

| 8,225,006 | B1* | 7/2012 | Karamcheti | .......... G06F 11/108 710/5 |
| 8,417,873 | B1* | 4/2013 | Karamcheti | ........ G06F 12/0246 711/103 |
| 8,904,082 | B1* | 12/2014 | Brahmadathan | .... G06F 13/1647 710/18 |
| 9,727,258 | B1* | 8/2017 | Nazarian | ............... G06F 3/0688 |
| 2006/0151614 | A1 | 7/2006 | Nishizawa et al. | |
| 2008/0082766 | A1* | 4/2008 | Okin | .................. G06F 13/1684 711/154 |
| 2008/0162980 | A1* | 7/2008 | Dahan | ................. G06F 13/1694 713/601 |
| 2011/0227234 | A1 | 9/2011 | Nishizawa et al. | |

FOREIGN PATENT DOCUMENTS

WO 2005004047 A1 1/2005

* cited by examiner

*Primary Examiner* — Farley Abad
(74) *Attorney, Agent, or Firm* — William Park & Associates Ltd.

(57) ABSTRACT

A semiconductor device includes: various types of memories; an interface configured to transmit memory characteristic information of the memories to a host, receive information needed to control operations of the memories from the host, and perform interfacing between the host and the memories; and a controller configured to control operations of the memories in response to information received from the host, and control an operation of the interface.

20 Claims, 3 Drawing Sheets

SEMICONDUCTOR DEVICE

CROSS-REFERENCE TO RELATED APPLICATION

This application is a continuation-in-part of the U.S. application Ser. No. 14/977,813 filed on Dec. 22, 2015, titled "SEMICONDUCTOR DEVICE" and claims priority under 35 U.S.C. 119(a) to Korean patent application No. 10-2015-0108192, filed on Jul. 30, 2015, the disclosure of which is hereby incorporated in its entirety by reference herein.

BACKGROUND OF THE INVENTION

Embodiments of the present disclosure relate to a semiconductor device.

Various kinds of memories have individual merits and demerits. For example, although a volatile memory such as DRAM has a high integration degree and a high access speed, the volatile memory is unable to retain stored data when powered off. Although a non-volatile memory such as a flash memory has a low integration degree, the non-volatile memory can retain stored even when powered off, such that there is no possibility of data loss.

As semiconductor devices are applied to various kinds of electronic appliances, various kinds of memories are implemented as a single semiconductor device such that only merits of various kinds of memories can be reflected into the single semiconductor device. However, various memories operate in different ways. Therefore, when different memories operate in one semiconductor device, there is a need for the factors depending on the operational characteristics of respective memories to be adjusted in response to interfaces of the respective memories.

BRIEF SUMMARY OF THE INVENTION

Various embodiments of the present disclosure are directed to providing a semiconductor device that substantially obviates one or more problems due to limitations and disadvantages of the related art.

An embodiment of the present disclosure relates to a semiconductor device for allowing various kinds of memories to operate through one control circuit.

An embodiment of the present disclosure relates to a semiconductor device in which various kinds of memories are mounted to one slot, and several memories mounted to one slot are coupled to each other through a relay, such that the degree of integration of each memory can be increased without addition of slots to be mounted.

In accordance with an aspect of the embodiment, a semiconductor device includes: various types of memories; an interface configured to transmit memory characteristic information of the memories to a host, receive information needed to control operations of the memories from the host, and perform interfacing between the host and the memories; and a controller configured to control operations of the memories in response to information received from the host, and control an operation of the interface.

In accordance with an aspect of the embodiment, a semiconductor device includes: a controller configured to store memory characteristic information regarding various types of memories, and output a control signal corresponding to the stored information; and an interface configured to perform interfacing between a host and the various types of memories, and control operation modes of the various types of memories in response to the control signal.

In accordance with an aspect of the embodiment, a semiconductor device includes: various types of memories; a controller configured to store memory characteristic information regarding the memories, and output a control signal corresponding to the stored information; and a unified device configured to receive information needed to control operation modes of the memories, select any one operation mode corresponding to the memory characteristic information of the memories from among the plurality of operation modes in response to the control signal, and perform interfacing using the selected operation mode.

It is to be understood that both the foregoing general description and the following detailed description are exemplary and explanatory and are intended to provide further explanation of the claims.

BRIEF DESCRIPTION OF THE DRAWINGS

The above and other features and advantages of the present disclosure will become readily apparent by reference to the following detailed description when considered in conjunction with the accompanying drawings.

DESCRIPTION OF EMBODIMENTS

Reference will now be made in detail to embodiments of the present disclosure, examples of which are illustrated in the accompanying drawings. Wherever possible, the same reference numbers will be used throughout the drawings to refer to the same or like parts.

In association with the embodiments of the present disclosure, specific structural and functional descriptions are disclosed only for illustrative purposes, the embodiments of the present disclosure can be implemented in various ways without departing from the scope or spirit of the present disclosure.

In description of the present disclosure, the terms "first" and "second" may be used to describe various components, but the components are not limited by the terms. The terms may be used to distinguish one component from another component. For example, a first component may be called a second component and a second component may be called a first component without departing from the scope of the present disclosure.

The terms used in the present application are merely used to describe specific embodiments and are not intended to limit the present disclosure. A singular expression may include a plural expression unless otherwise stated in the context.

Unless otherwise defined, all terms used herein, including technical or scientific terms, have the same meanings as understood by those skilled in the art. Terms defined in a generally used dictionary may be analyzed to have the same meaning as the context of the relevant art and may not be analyzed to have ideal meaning or excessively formal meaning unless clearly defined in the present application. The terminology used in the present disclosure is for the purpose of describing particular embodiments only and is not intended to limit the disclosure.

Figure 1:
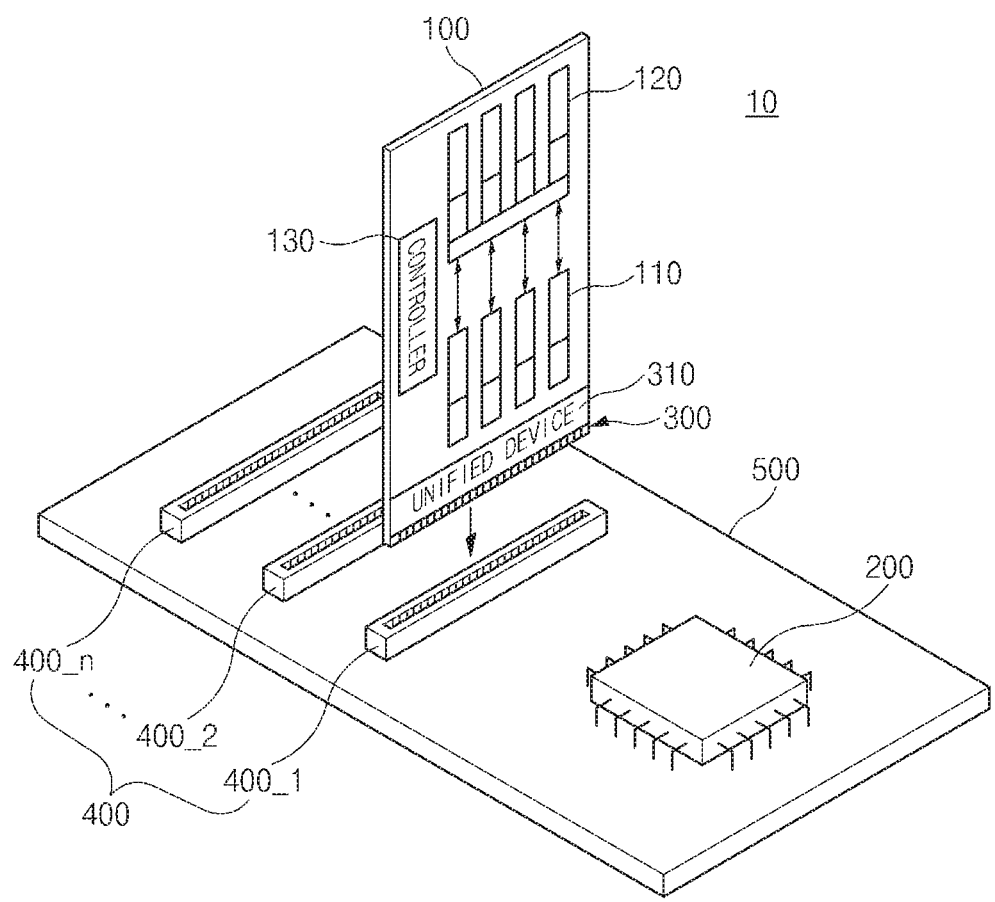
FIG. 1 is a schematic diagram illustrating a semiconductor device according to an embodiment of the present disclosure.

FIG. 1 is a schematic diagram illustrating a semiconductor device according to an embodiment of the present disclosure.

Referring to FIG. 1, the semiconductor device 10 according to an embodiment may include a memory device 100, a host 200, a slot 400, and a substrate 500.

The memory device 100 may include various types of memories 110, 120, a controller 130, and an interface 300. In this case, the memory device 100 may include a single interface 300 in response to various kinds of memories 110, 120. The controller 130 may control the operations of the memories 110, 120 and the interface 300.

Memories 110, 120 contained in the memory device 100 may have different operation characteristics and different form factors. For example, the memory device 100 may include volatile memories and/or non-volatile memories. The volatile memories may be classified into a static RAM (SRAM), a dynamic RAM (DRAM), a synchronous DRAM (SDRAM), etc. The non-volatile memory devices may be classified into a read only memory (ROM), a programmable read-only memory (PROM), an erasable erase and programmable ROM (EEPROM), an electrically erasable and programmable ROM (EPROM), a flash memory, a phase change RAM (PRAM), a magnetic RAM (MRAM), a resistive RAM (RRAM), a ferroelectric RAM (FRAM), etc. In addition, the memory device 100 may further include new memories, for example, a Spin-Torque Transfer Magnetic Random Access Memory (STTMRAM), a Phase Change RAM (PCRAM), a Resistive RAM (ReRAM), etc.

The host 200 may transmit not only a command (request or command signal) but also an address and data to the memory device 100, and may receive data from the memory device 100. In accordance with the embodiment, the host 200 may include at least one of a Central Processing Unit (CPU), a Graphic Processing Unit (GPU), a multimedia processor (MMP), a digital signal processor (DSP), etc.

The host 200 may store memory characteristic information of various memories 110, 120 contained in the memory device 100, for example, positions (physical and logical positions), types, capacities, etc. of the memories. The host 200 may process a command, an address, and data to be appropriate for a memory attempting to execute the command on the basis of the memory characteristics such as the position, type, and capacity of a specific memory, and may then provide the processed command, address, and data. In addition, when receiving data from the specific memory, the host 200 may interpret the received data on the basis of the stored memory characteristic information.

In accordance with the embodiment, the host 200 may provide the command, address, and data on the basis of AC parameters appropriate for each memory. In addition, the host 200 may adjust the size of data capable of being transmitted once or may control a transfer rate according to characteristics of the memory, may perform address mapping or protocol conversion according to characteristics of the memory.

In accordance with the embodiment, the host 200 may periodically refresh volatile memories contained in the memory, and may transmit data contained in the volatile memories to the non-volatile memory in response to power cut-off.

In accordance with the embodiment, the host 200 may directly receive unique characteristics (e.g., the position, type, and capacity of each memory) of each memory contained in the memory device 100 from the external part, may search for the memory device 100 in an initial state, and may thus acquire characteristic information of each memory contained in the memory device 100. Therefore, the semiconductor device 10 according to the embodiment may flexibly operate even when the position of each memory contained in the memory device 100 is changed.

In accordance with the embodiment, type- or category-information of the memory may be contained in information communicated between the host 200 and the memory device 100. Therefore, when the signal transmitted from the host 200 to the memory device 100 is transmitted through the interface 300, the interface may perform interfacing appropriate for the memory. In addition, the host 200 may recognize which memory is associated with the signal received from the memory device 100, such that the host 200 may interpret the received signal.

The interface 300 according to the embodiment may include a unified device 310 configured to perform interfacing between the host 200 and the memory device 100. In this case, the unified device 310 may be controlled by a control signal received from the controller 130. The unified device 310 of the interface 300 may include a physical layer (PHYsical), a Phase Locked Loop (PLL) circuit, etc., such that the unified device 310 may perform the substantial interfacing operation. The unified device 310 may be used to perform signal conversion according to a communication medium for use in a communication protocol. The unified device 310 may be a circuit configured to perform a physical function for use in the communication protocol.

For example, the unified device 310 may also apply interface specifications to various kinds of devices, for example, Non-Volatile Dual In-line Memory Module (NVDIMM), Conventional DIMM, Ultra DIMM, Solid State Drive (SSD), etc.

The unified device 310 may convert data, command, address, etc. adjusted according to characteristics of the memory into other information using the interface appropriate for each memory. The interface 300 according to the embodiment acting as the unified interface may perform interfacing appropriate for various types of memories.

In accordance with the embodiment, specific information indicating which one of the interfacing operations will be executed by the interface 300 may be based on the signal received from the host 200 or memory type information contained in the signal received from the memory device 100.

The unified device 310 may compress or decode the address, command, and data received from the host 200 according to the interface of a destination memory, so as to acquire the result optimized for the destination memory, such that the optimized result can be converted into a physical signal. The unified device 310 may digitize and encode the physical signal, and may then provide the encoded result to the memory device 100.

For example, the interface 300 may communicate with the host 200 through one of several various interface protocols, for example, a Serial Advanced Technology Attachment (SATA) protocol, a Peripheral Component Interconnect Express (PCIe), a Universal Serial Bus (USB) protocol, other connectors, and other interfaces.

For example, the interface 300 may include at least one bus (e.g., an address bus and/or a data bus) having a bus structure associated with an Open NAND Flash Interface (ONFI), a compact flash interface, a multimedia card (MMC), a Secure Digital (SD), CE-ATA, an Industrial Standard Architecture (ISA), a Micro-Channel Architecture (MSA), an Extended ISA (EISA), an Intelligent Drive Electronics (IDE), a VESA Local Bus (VLB), a Peripheral Component Interconnect (PCI), a card bus, a Universal Serial Bus (USB), an Advanced Graphics Port (AGP), a Personal Computer Memory Card International Association (PCMCIA) bus, an IEEE 1394 serving as a firewall, and a Small Computer Systems Interface (SCSI). As a result, the interface 300 may communicate with various types of memories contained in the memory device 100.

Therefore, the interface 300 may perform interfacing appropriate for various types of memories contained in the memory device 100.

In accordance with the embodiment, the unified device 310 may serve as the memory controller. The unified device 310 may perform address remapping, and may share memory characteristic information with the host 200 such that it may manage the memory characteristic information at a high level.

In accordance with the embodiment, the memory device 100 may be implemented as a card acting as a single physical object together with the interface 300, and may be mounted to a plurality of slots (400_1, 400_2, . . . , 400_n) contained in the substrate 500.

The memory device 100 may be mounted to individual slots (400_1, 400_2, . . . , 400_n) one by one, and the memory device 100 mounted to the slot may communicate with the host 200 through a conductive line printed on the substrate 500.

As described above, data is converted to be appropriate for various types of memories through the host 200 and the interface 300 and is then applied to the memory device 100. as a result, even when all kinds of memories are contained in the memory device 100, all the memories can communicate with the host 200.

Various kinds of memories are contained in the memory device 100, and several memories are interconnected through a relay, such that the integration degree of the memory device 100 mounted to one slot can be increased.

Figure 2:
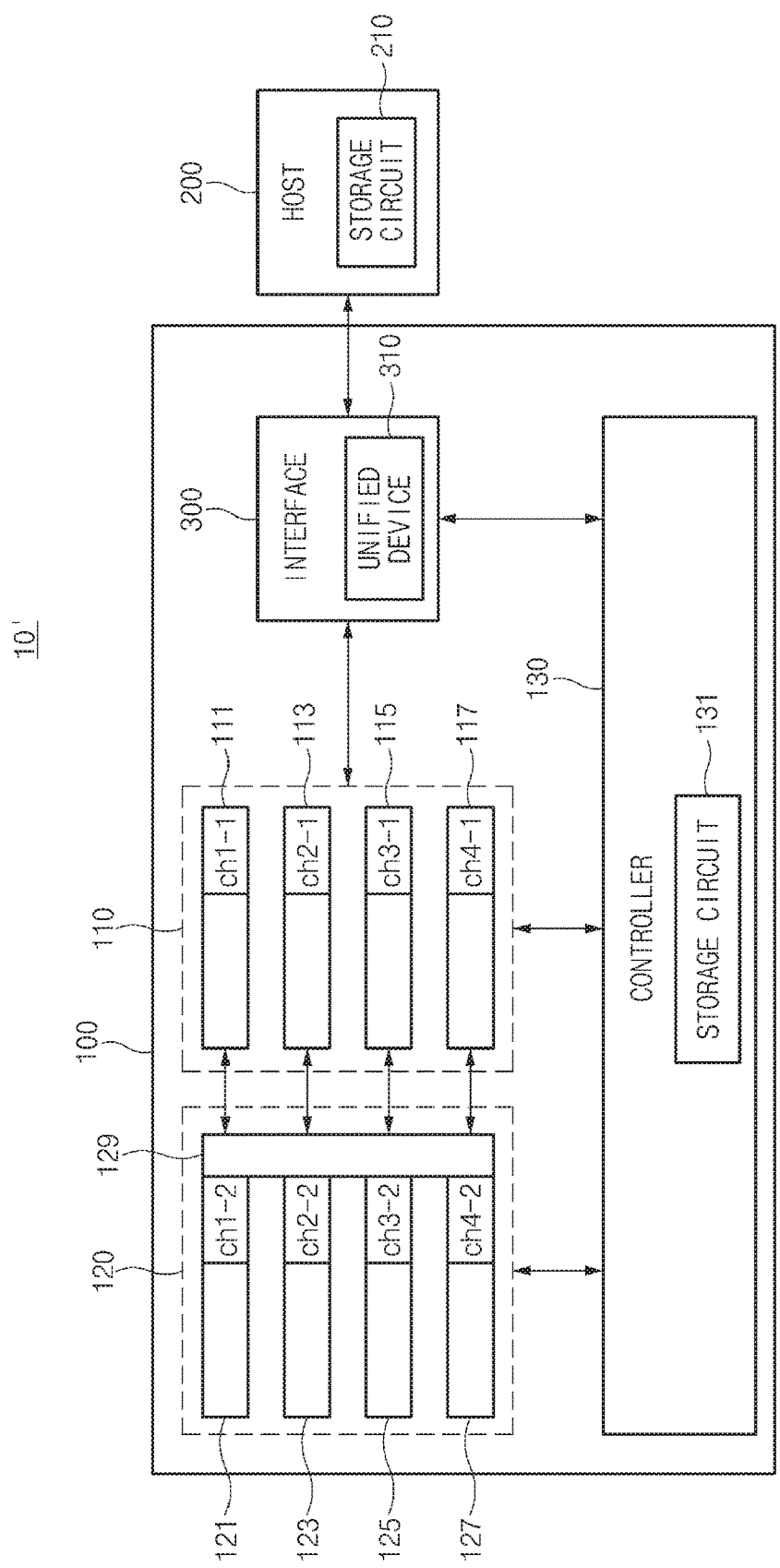
FIG. 2 is a block diagram illustrating a semiconductor device according to an embodiment of the present disclosure.

FIG. 2 is a block diagram illustrating a semiconductor device according to an embodiment of the present disclosure.

Referring to FIG. 2, the semiconductor device 10' may include a memory device 100 and a host 200.

The memory device 100 may include a master memory 110, a slave memory 120, a controller 130, and an interface 300. The controller 130 may include a storage circuit 131 configured to store information needed for the control operation. In addition, the interface 300 may include the unified device 310 configured to perform interfacing appropriate for the memories 110, 120.

A plurality of master memories (111, 113, 115, 117) contained in the master memory 110 may be coupled to a plurality of slave memories (121, 123, 125, 127) through a relay 129 contained in the slave memory 120.

In accordance with the embodiment, the memory device 100 may communicate with the host 200 through the interface 300 over a plurality of channels (ch1, ch2, ch3, ch4). One channel may communicate with the host 200 at one time, and each channel may independently operate. Although the embodiment of the present disclosure has exemplarily disclosed that each of the number of master memories (111, 113, 115, 117), the number of slave memories (121, 123, 125, 127), and the number of channels (ch1, ch2, ch3, ch4) is set to 4 for convenience of description, the scope or spirit of the embodiment of the present disclosure is not limited thereto, and each of the number of memories and the number of channels can also be changed to another number as necessary.

The same kind of memories may be coupled to one channel, such that a plurality of memories may be relayed within a channel through the relay 129 such that each memory may serve as a memory.

For example, as can be seen from FIG. 2, the memory device 100 may include four channels (ch1, ch2, ch3, ch4). The first channel (ch1-1, ch1-2) may include a first master memory 111 and a first slave memory 121. The first master memory 111 may communicate with the host 200 through the interface 300. If storage capacity of the first master memory 111 is insufficient, the first slave memory 121 may guarantee a storage space of data. Assuming that storage capacity is insufficient even when the first slave memory 121 is used, one or more additional slave memories may be mounted to the memory device 100 as necessary.

Although one or more additional slave memories are mounted to the memory device 100 as shown in FIG. 1, the memory device 100 is mounted to one slot 400, such that an additional plane space for the memory space is no longer required. Therefore, the semiconductor device 10' according to the embodiment may easily and flexibly guarantee a data storage space.

The first master memory 111 and the first slave memory 121 may have the same memory characteristics.

In this way, the second master memory 113 and the second slave memory 123 contained in the second channels (ch2-1, ch2-2), the third master memory 115 and the third slave memory 125 contained in the third channels (ch3-1, ch3-2), and the fourth master memory 115 and the fourth slave memory 125 contained in the fourth channels (ch4-1, ch4-2) may have the same memory characteristics.

Accordingly, the host 200 may store memory characteristics (e.g., the position, type, and capacity of each memory) of each memory per channel, as memory characteristic information, in the storage circuit 210, and may then manage the memory characteristics stored in the storage circuit 210.

The interface 300 may confirm connection states of the memories (111, 113, 115, 117, 121, 123, 125, 127) contained in the memory device 100, and may perform interfacing between the host 200 and the memory device 100.

In this case, the interfacing operation of the interface 300 may be controlled by a control signal received from the controller 130. That is, the controller 130 may select operation modes of the interface 300 and the unified device 310 on the basis of capacity, speed, latency, operation voltage, etc. of the master memory 110 and the slave memory 120.

The unified device 310 may be shared by the master memory 110 and the slave memory 120 through the plurality of channels (ch1, ch2, ch3, ch4). Different types of memories may be inserted into the unified device 310 through the plurality of channels (ch1, ch2, ch3, ch4). In addition, memories may also be inserted into the unified device 310 using only some channels selected from among the plurality of channels (ch1, ch2, ch3, ch4). The unified device 310 may recognize a connection state between the memories 110, 120 under the control of the controller 130.

The unified device 310 may include a plurality of operation modes to perform interfacing. That is, the unified device 310 may operate in a first operation mode during a predetermined time, and may operate in a second operation mode during the next time after lapse of the predetermined time. In this case, the first operation mode and the second operation mode may be modes related to frequency change when signals are communicated between the memory device 100 and the host 200. The controller 130 may control the operation mode of the unified device 310 in response to memory characteristic and operation information.

For example, the unified device 310 may perform interfacing at a low clock frequency during the first operation mode, and may perform interfacing at a high clock frequency during the second operation mode. In accordance with the embodiment, the unified device 310 may transmit information stored in the storage circuit 131 to the host 200 during the first operation mode, and may transmit user data stored in the master memory circuit 110 and the slave memory circuit 120 to the host 200 during the second operation mode. In this case, the user data may refer to command data, protocol data, control data, synchronous data, packet data, or the like executed in the memory device 100 by the external controller. In accordance with the embodiment, the user data may be a generic term of data that is generated and stored when the application is executed by the user, and may further include other types of data in addition to the above-mentioned data.

The embodiment of the present disclosure has exemplarily disclosed that information stored in the storage circuit 131 is transmitted to the host 200 during the first operation mode, or the user data stored in the memories 110, 120 is transmitted to the host 200 during the second operation mode. However, the scope or spirit of the embodiment of the present disclosure is not limited thereto, and it should be noted that information stored in the storage circuit 131 is transmitted to the host 200 during the second operation mode or the user data stored in the memories 110, 120 is transmitted to the host 200 during the first operation mode. Signals or data to be transmitted may also be changed according to operation modes. In addition, although the embodiment of the present disclosure has exemplarily disclosed that the operation modes are exemplarily set to first and second modes for convenience of description, the number of operation modes according to the present disclosure is not limited thereto.

The controller 130 may store information needed to control the master memory 110, the slave memory 120, and the interface 300 in the storage circuit 131. For example, the storage circuit 131 may store memory characteristic information, such as positions (physical and logical positions), types, and capacities of the memories 110, 120.

If the controller 130 receives a request signal (memory search command) for memory characteristic information from the host 200 through the interface 300, the controller 130 may transmit memory characteristic and operation information stored in the storage circuit 131 to the host 200 through the interface 300. In addition, during a specific operation mode of the memory device 100, the controller 130 may also transmit the memory characteristic and operation information stored in the storage circuit 131 to the host 200 according to a predetermined operation period.

In contrast, the controller 130 may receive information from the host 200 through the interface 300, and may store the received information in the storage circuit 131. In response to information stored in the storage circuit 131, the controller 130 may provide information (e.g., a command, an address, a control signal, data, etc.) appropriate for a specific memory to be used for command execution.

In this case, information stored in the storage circuit 131 may be AC parameters related to the respective memories, wherein the AC parameters are received from the host 200. The command, address, and data stored in the storage circuit 131 may be generated based on the AC parameters. In response to the information stored in the storage circuit 131, the controller 130 may control a data size, a transfer rate, address mapping, a refresh operation, data transmission, and protocol conversion.

Figure 3:
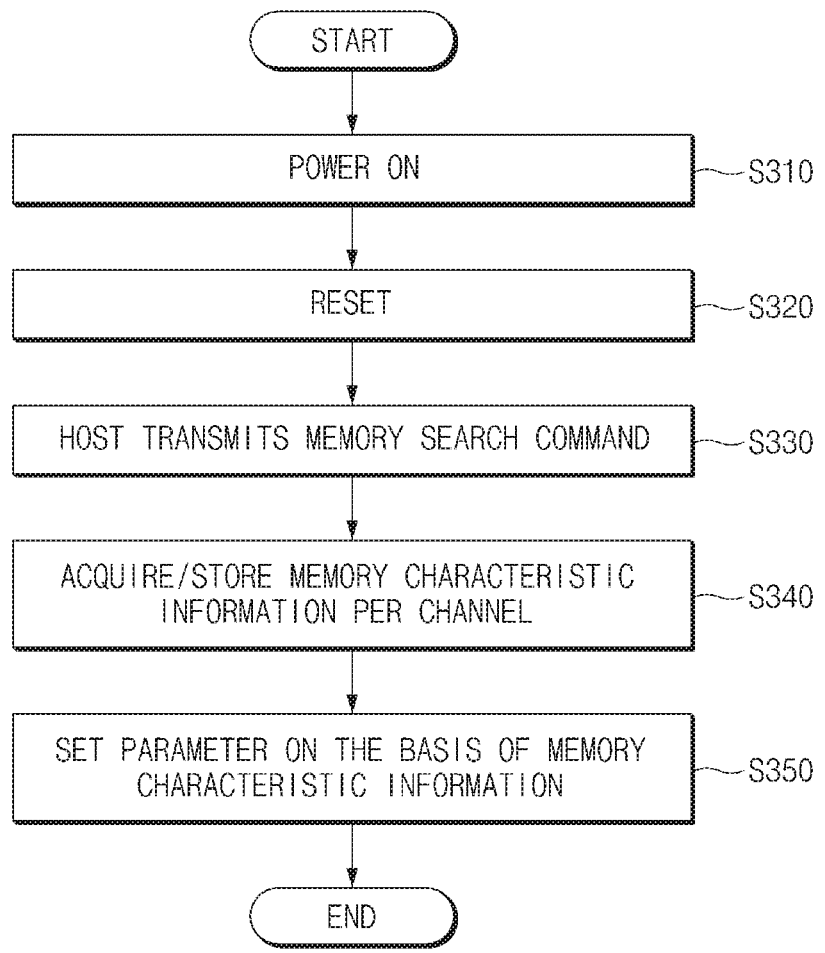
FIG. 3 is a flowchart illustrating the operations of the semiconductor device according to an embodiment of the present disclosure.

FIG. 3 is a flowchart illustrating the operations of the semiconductor device according to an embodiment of the present disclosure. The setting operations of the semiconductor devices (10, 10') will hereinafter be described with reference to FIG. 3.

As described above, various types of memories may be contained in the semiconductor devices (10, 10') according to the embodiment, and types of memories contained in one memory device 100 may be changed in various ways. Therefore, the setting operation indicating the type and characteristics of each memory of a specific channel and characteristics thereof is needed.

The operations of the semiconductor devices (10, 10') according to the embodiments will hereinafter be described with reference to FIGS. 1 to 3.

If the semiconductor device (10, 10') is powered on in step S310, the semiconductor device (10, 10') may be reset in operation S320. The reason why the semiconductor device (10, 10') is reset is that the types and positions of memories contained in the memory device 100 may be changed. However, according to the embodiments, the semiconductor device (10, 10') may not perform resetting.

The host 200 contained in the semiconductor device (10, 10') may transmit a command for searching for a memory contained in the memory device 100 in step S330. As described above, the memory search command may be executed through such resetting whenever the semiconductor device (10, 10') is powered on, or may be executed at intervals of a predetermined time period.

Upon receiving the memory search command from the host 200, the controller 130 may transmit memory characteristic information of various memories (111, 113, 115, 117, 121, 123, 125, 127) contained in the memory device 100 to the host 200 through the interface 300 in response to the received memory search command. The host 200 may store the transmitted memory characteristic information in the storage circuit 210 in step S340.

In accordance with the embodiment, memory characteristic information of the memory device 100 may be acquired and stored per channel. The memory characteristic information of the memory device 100 may include the position, type, capacity, etc. of each memory.

The host 200 may set the parameters appropriate for memories coupled to individual channels on the basis of the received memory characteristic information in step S350. For example, the host 200 may adjust the AC parameter. The adjusted AC parameter may also be stored in the storage circuit 210. The host 200 may transmit the adjusted AC parameter information to the controller 130 through the interface 300.

After completion of the setting operation shown in FIG. 3, the host 200 may communicate with the memory device 100 so as to perform the read or write operation. In this case, the host 200 may store the memory characteristic information of the memory located at a specific channel of the memory device 100 in the storage circuit 210. Therefore, the host 200 may transmit the command, address, data, etc. so as to perform the read and write operations appropriate for the memory.

The host 200 may include memory type information of the memory located at a specific channel, such that the host 200 may transmit the command, address, data, etc. to the controller 130 through the interface 300. The command, address, and data transmitted from the host 200 to the controller 130 may be signals obtained by adjusting the AC parameter according to the memory characteristic information.

The interface 300 may convert the command, address, and data received from the host 200 into signals appropriate for the interface used by the memory, upon receiving the memory type information from the host 200. For example, the interface 300 may perform encoding, decoding, or address remapping of the received command, address, and data.

In contrast, if the host 200 receives data from the memory device 100, the host 200 may recognize which channel is associated with data received from the memory device 100, such that the host 200 may interpret the received data using the scheme appropriate for the recognized channel. In accordance with another embodiment, the signal transmitted from the memory device 100 to the host 200 may include memory type information. Therefore, the host 200 may interpret the received signal on the basis of the received memory type information.

As described above, the semiconductor device according to the embodiment allows the host 200 to adjust the AC parameter on the basis of memory characteristic information in association with the memory device 100 including various kinds of memories, and includes the unified interface 300 such that the semiconductor device can interface with various memories through the unified interface 300.

In addition, various memories are mounted to one slot, and can be extended through a relay, resulting in increased integration degree.

As is apparent from the above description, the semiconductor device according to the embodiments includes an interface capable of driving various kinds of memories, such that it can easily and smoothly operate even when other memories having different characteristics from the mounted memories are added.

The semiconductor device according to the embodiments can mount various kinds of memories to a single slot, resulting in an increased integration degree.

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it is obvious to those skilled in the art that claims that are not explicitly cited in each other in the appended claims may be presented in combination as an exemplary embodiment of the present disclosure or included as a new claim by a subsequent amendment after the application is filed.

Although a number of illustrative embodiments consistent with the invention have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

What is claimed is:

1. A semiconductor device comprising:
    various types of memories;
    an interface configured to transmit memory characteristic information of the memories to a host, receive information needed to control operations of the memories from the host, and perform interfacing between the host and the memories; and
    a controller configured to control operations of the memories in response to information received from the host, and control an operation of the interface,
    wherein the controller further includes:
    a storage circuit configured to store the memory characteristic information generated for each channel and an AC parameter generated for each memory on the basis of the memory characteristic information.

2. The semiconductor device according to claim 1, wherein the memories include:
    a master memory configured to communicate with the host through the interface, and include various types of master memory; and
    a slave memory coupled to the master memory through a relay, configured to include various types of slave memories.

3. The semiconductor device according to claim 2, wherein the same type of memories from among the various types of master memories and the various types of slave memories are interconnected through the relay within one channel.

4. The semiconductor device according to claim 1, wherein the storage circuit is configured to store at least one of data, command, and address for the memories, wherein the data, the command, and the address are generated on the basis of the AC parameter.

5. The semiconductor device according to claim 1, wherein the controller is configured to transmit information stored in the storage circuit to the host through the interface according to a predetermined operation period.

6. The semiconductor device according to claim 1, wherein the controller is configured to select an operation mode of the interface according to characteristic information of at least one of capacity, speed, latency, and operation voltage of the memories.

7. The semiconductor device according to claim 1, wherein the controller is configured to transmit the memory characteristic information and operation information to the host through the interface, upon receiving a signal for requesting the memory characteristic information from the host.

8. The semiconductor device according to claim 1, wherein the controller is configured to control an operation of at least one of a data size, a transfer rate, address mapping, a refresh operation, data transmission, and protocol conversion of the memories.

9. The semiconductor device according to claim 1, wherein the memory characteristic information includes information of at least one of position information, type information, and capacity information of the memories.

10. The semiconductor device according to claim 1, wherein the interface is configured to perform address remapping on the basis of type information of the memories.

11. The semiconductor device according to claim 1, wherein the interface is configured to check a connection state of the memories for each channel.

12. The semiconductor device according to claim 1, wherein the interface includes:
    a unified device controlled by the controller, configured to perform signal conversion in response to characteristic information of the memories.

13. The semiconductor device according to claim 12, wherein the unified device includes a physical layer.

14. The semiconductor device according to claim 12, wherein the unified device includes a plurality of operation modes, and selects any one of the plurality of operation modes according to a control signal of the controller.

15. The semiconductor device according to claim 12, wherein the unified device operates in a first operation mode during a predetermined time, and enters and operates in a second operation mode after lapse of the first operation mode.

16. The semiconductor device according to claim 15, wherein the first operation mode and the second operation mode are operated in any one of a low clock frequency mode and a high clock frequency mode.

17. The semiconductor device according to claim 15, wherein the first operation mode and the second operation mode are operated in any one of a mode in which information stored in the controller is transmitted to the host and the other mode in which user data stored in the memories is transmitted to the host.

18. A semiconductor device comprising:
a controller configured to store memory characteristic information regarding various types of memories, and output a control signal corresponding to the stored information; and
an interface configured to perform interfacing between a host and the various types of memories, and control operation modes of the various types of memories in response to the control signal,
wherein the controller further includes:
a storage circuit configured to store the memory characteristic information generated for each channel and an AC parameter generated for each memory on the basis of the memory characteristic information.

19. The semiconductor device according to claim 18, wherein the storage circuit is configured to store at least one of data, command, and address for the memories, wherein the data, the command, and the address are generated on the basis of the AC parameter.

20. A semiconductor device comprising:
various types of memories;
a controller configured to store memory characteristic information regarding the memories, and output a control signal corresponding to the stored information; and a unified device configured to receive information needed to control operation modes of the memories, select any one operation mode corresponding to the memory characteristic information of the memories from among the plurality of operation modes in response to the control signal, and perform interfacing using the selected operation mode,
wherein the controller further includes:
a storage circuit configured to store the memory characteristic information generated for each channel and an AC parameter generated for each memory on the basis of the memory characteristic information.

* * * * *